Feb. 1, 1949.   L. M. RODGERS   2,460,597
POSITION INDICATION AND CONTROL SYSTEM
Filed Aug. 4, 1945
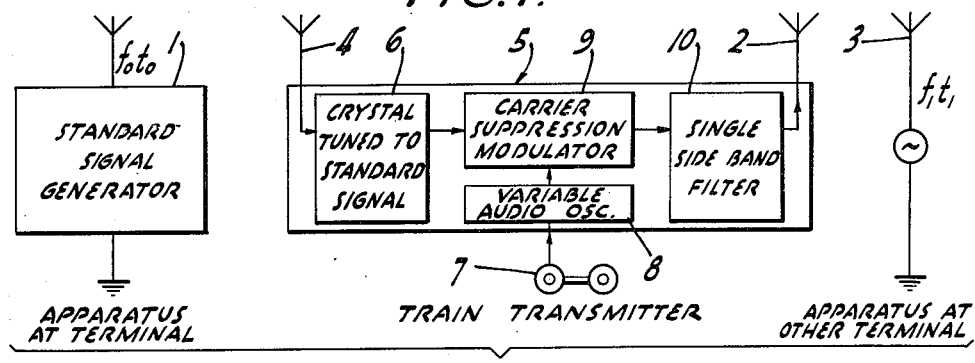
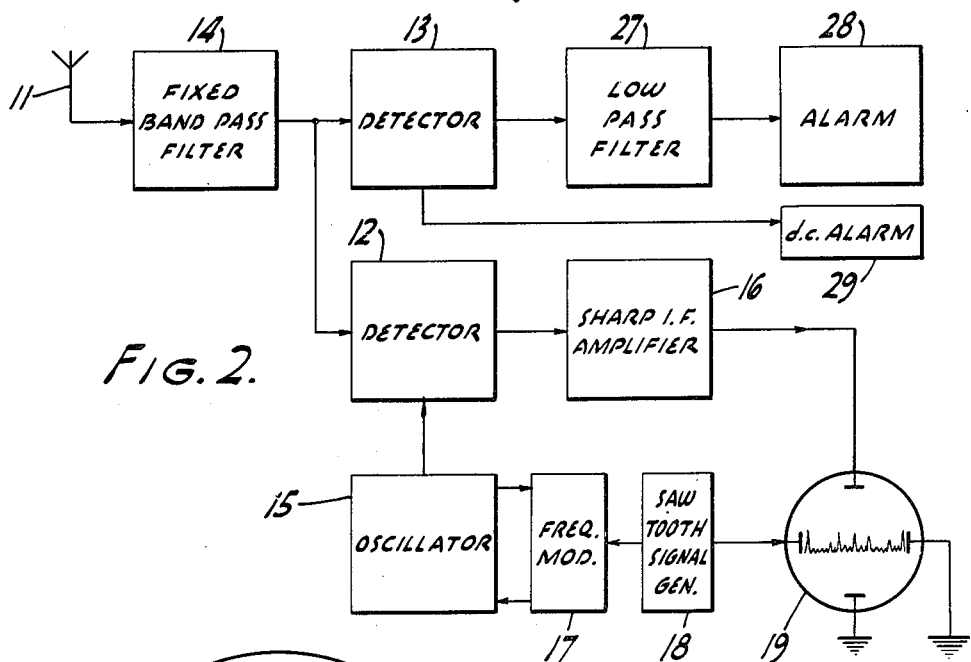
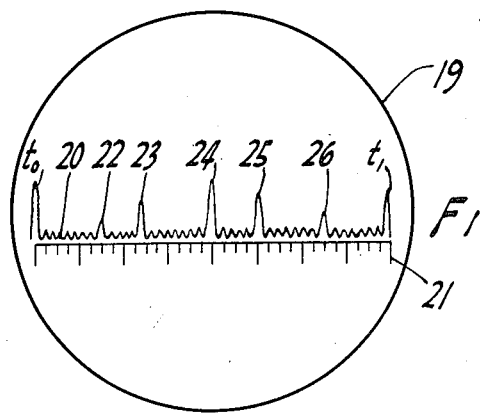
INVENTOR.
Lionel M. Rodgers
BY HIS AGENT
Carl H. Synnestvedt Patented Feb. 1, 1949

2,460,597

UNITED STATES PATENT OFFICE 2,460,597

POSITION INDICATION AND CONTROL SYSTEM

Lionel M. Rodgers, Springfield Township, Montgomery County, Pa., assignor, by mesne assignments, to Philco Corporation, Philadelphia, Pa., a corporation of Pennsylvania Application August 4, 1945, Serial No. 608,953

2 Claims. (Cl. 177—353)

My invention relates to a method of and apparatus for indicating the position of moving objects and is especially concerned with systems for indicating the position of vehicles such, for example, as railroad trains.

An object of my invention is to provide a transmitter to be carried by a moving body, such as a train, which will transmit an electrical signal indicative of the position of the body.

Another object resides in the provision of a receiver for such signals, which will give visible indication of the relative positions of such trains, or other bodies.

It is a further object of my invention to provide an alarm system adapted to warn an operator that two or more of such moving bodies are in such close proximity to each other as to require attention.

My invention also contemplates providing such an alarm system, which is further adapted to warn the operator, should said alarm system fail to function.

Still a further object of my invention resides in providing for transmission, by the movable body, of a signal giving its position with close precision, without the use of highly precise electrical apparatus at the transmitter. To the foregoing general ends, the apparatus of the invention uses a precisely controlled auxiliary signal, propagated from one or more transmitters which may be fixed in location, to generate a position signal for transmission by the movable body.

In general my invention provides a practical working system, particularly well adapted for use on railroads, which, when so used, will supply an indication of the positions of the trains as well as an alarm which indicates when two or more trains are too close to each other, for safety.

Other objects will be apparent from a consideration of the following specification, including the accompanying drawings, in which I describe an illustrative embodiment of my invention, as applied to railway apparatus.

In the drawings:

Fig. 1 is a block diagram of the apparatus used to transmit position-indicating signals;

Fig. 2 is a block diagram of a system for receiving such position-indicating signals, including an alarm for indicating the proximity of two trains; and Fig. 3 is an enlarged diagrammatic view of the position indicator of Fig. 2.

Figs. 1 and 2, taken together, represent the complete system, while Fig. 3 represents a detail of Fig. 2.

A major problem to be solved in devising the system of the present invention involved realization of a device of such a nature that a train could transmit an indication of its location, with the requisite high precision. Among the various possible signals, I have chosen to provide a continuous carrier wave signal, the frequency of which is characteristic of the position of the train. The position of the train, as determined by an odometer, could be applied directly to the frequency-determining elements of the transmitter, but apparatus of this nature, capable of the required precision, would be expensive and not of the highest reliability. The novel and highly reliable apparatus which the invention employs to generate the required signal is illustrated in Fig. 1.

In this figure there is a system involving three radio transmitters 1, 2, and 3. Transmitter 1 is preferably at a fixed location and generates a continuous signal of a closely controlled single frequency. This frequency will be hereinafter referred to as $f_0$ and the location of its transmitter will be referred to as $t_0$. While the location $t_0$ preferably coincides with the location of the central station, or terminal, such is not necessarily the case. This fact should be borne in mind in connection with the invention in which the location $t_0$ should be understood broadly as any established point of reference.

The signal transmitted by transmitter 1 is received by receiver 4 on train 5. Preferably, and as illustrated, this receiver is provided with a filter 6, which is capable of accepting signals of the frequency transmitted by transmitter 1, and of discriminating against signals of other frequencies. Filter 6 may, therefore, consist of a crystal, or a filter including crystals, as is well known in the art. These crystals or filters are adjusted to frequency $f_0$. The train 5 is provided with an odometer mechanism, illustrated diagrammatically at 7, which serves to determine the position of the train on the track. The odometer mechanism controls the frequency of the signal to be transmitted by train 5, but, as mentioned hereinabove, I prefer to accomplish this without applying the determinations of the odometer directly to the usual frequency determining elements of the transmitter. Accordingly, there is associated with the odometer 7, a variable frequency oscillator 8, which preferably generates a frequency which is proportional to the reading of the odometer 7. This frequency may be within the audible range or beyond that range, as desired.

The signal from oscillator 8 is mixed in the modulator 9 with the signal from filter 6. It is generally impractical to retransmit the same signal as the incoming frequency, because continuous uncontrolled oscillations would be generated. I avoid this difficulty by using, for the modulator 9, a carrier suppression modulator of the Carson type (see Radio Engineer's Handbook, Terman, 1943 edition, pp. 551–3). The result of the operation of the modulator 9 on the signals from filter 6 and oscillator 8 is the generation of two side bands, each differing from the frequency $f_0$ by the frequency then being generated by oscillator 8. It will be evident that either of these signals is characteristic of the location of the train as indicated by odometer 7, and that the frequency of each side band is closely controlled.

The output of the modulator 9, amplified to any required extent, may be retransmitted from transmitter 2, but as it is unnecessary to my invention to transmit both side bands, and to avoid the transmission of unnecessary signals and the unnecessary use of power, a single side band filter 10 may be inserted between the modulator 9 and the transmitter 2. Thus, when using this system including the single side band filter 10, the transmitter 2 will radiate a signal, whose frequency is indicative of the position of the train, with sufficient precision for the purposes of the invention.

The transmitter 3 transmits a continuous signal of frequency $f_1$ and may be considered as being at location $t_1$ as referred to hereinafter. For present purposes it may be considered to be a transmitter at the opposite terminal of the line from the transmitter 1. Its frequency $f_1$ is preferably the same frequency which the train transmitter 2 will transmit, when the train arrives at location $t_1$. The uses of the transmitter 3 will be further discussed below.

While the transmitter 1 will generate a continuous signal, there are some purposes for which it is desirable to interrupt the continuity of the signal transmitted by transmitter 2. These purposes will be discussed more fully hereinafter, and this required interruption may be accomplished by using the apparatus described in my copending application, Serial No. 608,952, filed August 4, 1945. One purpose for which such interruptions may be used, is to identify the train transmitting the signal so that possible confusion, such as might otherwise arise when one train passes another, may be avoided.

Fig. 2 represents, diagrammatically, a receiver for receiving the signals transmitted by the transmitters 1, 2, and 3, of Fig. 1. One such receiver is preferably located on each train, one at each terminal, and one in the office of each dispatcher, or other supervisor of that controlled portion of the railroad. The device of Fig. 2 serves two purposes. It indicates continuously the location of all the trains along a predetermined portion of the track and, if desired, their identity. It also operates an alarm in case two trains are closer together than safety conditions permit.

The receiver of Fig. 2 is provided with an antenna 11 adapted to receive signals from transmitters 1, 2, and 3, and to apply them to detectors 12 and 13. A band pass filter 14, which is adapted to pass signals in the band of frequencies between frequency $f_0$ and $f_1$ and to discriminate against all other frequencies, is preferably included between antenna 11 and detectors 12 and 13, particularly if single side band filter 10 is not used in the train transmitters. The purpose of that system including detector 12, is to provide a visible indication of the positions of the trains on the track. The purpose of the system supplied by detector 13, is to actuate an alarm in case two trains are too close together. The indicating system will be first described.

I have discovered that a practical indicator for the positions of trains can be developed by the use of principles involved in what is known in the radio art as the panoramic receiver. Various modifications of the panoramic receiver have been developed and the basic principles are known and described in contemporary literature. It will be sufficient for present purposes to identify the particular modification used, in terms of the operations of the various components. To facilitate an understanding, one may consider that an ordinary radio broadcast receiver is connected to a cathode ray oscilloscope in such a manner that the beam of the oscilloscope will be deflected in the vertical direction and upwardly as the signal intensity increases. Means is provided for deflecting the beam horizontally, and such deflecting means is actuated by the tuning or frequency-varying control of the receiver. With such a mechanism as the tuning control is moved through its range, the relative intensity of the signals and their relative frequencies will be indicated by a graph or trace on the face of the oscilloscope. This simplified system will only operate if the tuning control passes through its range at a rate consistent with the ability of the oscilloscope to retain a bright line. For this reason, in a panoramic receiver, the frequency variation is provided by electrical rather than mechanical means. Having these facts in mind, the operation of the panoramic system which I have used will be evident. The filter 14 serves as the source of signals. These signals are applied to the detector 12 where they are mixed with oscillations from oscillator 15 to provide a difference frequency according to the well known principles of the superheterodyne. This difference frequency is applied to filter 16 which has a relatively narrow pass band compared to the band of frequency passed by filter 14. Comparing the structure thus far described with the simplified panoramic receiver described above, it will be seen that the output of the filter 16 corresponds to the output of the radio broadcast receiver in the example.

In order to provide for rapid tuning throughout the frequency band passed by filter 14, oscillator 15 is connected to frequency modulator 17 which, in turn, is actuated by sawtooth signal generator 18. The frequency modulator 17 may be any convenient one of the numerous types known in the art, but I prefer to use the one disclosed and claimed in the patent to Travis, No. 2,240,428, issued April 29, 1941, since the Travis device provides a more linear relation between the frequency of the oscillator and the voltage of the signal applied to the modulator. The sawtooth signal generator 18 may be any one of those available in the art, and preferably generates a sawtooth voltage between 10 and 100 cycles per second in frequency. This frequency is related to the retentivity characteristic of the screen of the cathode ray tube 19, and can be chosen accordingly.

The sawtooth generator 18 generates a wave which rises over a period of about $1/30$ of a second, linearly with respect to time, to a maximum value.

This wave then stops rising and falls to its initial value, preferably in the minimum practical time. This cycle is repeated continuously, without attention on the part of the operator. The wave generated by generator 18, applied to the frequency modulator described in the Travis patent, causes the frequency of the oscillator 15 to vary at the same rate to an extent corresponding to the instantaneous variations of the sawtooth signal. It will thus be apparent that the signal supplied from the oscillator 15 to the detector 12 will be a signal whose frequency varies continuously and uniformly, from one limit to the other, over a period of about 1/30 of a second and then immediately repeats this variation without attention by the operator.

From the description of the signal provided by the oscillator 15 to the detector 12, it will be evident that, in this embodiment of the panoramic principle, the difference frequency applied to filter 16 will consist of a series of different frequencies each changing in frequency so that each one passes through the acceptance region of the filter 16 once during each cycle. The nature of this operation is fully set forth in the literature concerning the panoramic receiver and it will be understood from the simplified example recited above.

The output signal of the filter 16, amplified if required is applied to the vertical deflection elements of the oscilloscope 19. In the absence of a signal causing horizontal deflection, the beam would move vertically in response to the signals passing through the filter 16 whenever they were present, but would stay in a rest position at all other times.

Horizontal deflection of the beam of the oscilloscope 19 is provided by applying the signal generated by sawtooth generator 18 to the horizontal deflecting means of the oscilloscope. The apparatus thus described is, therefore, a complete panoramic receiver operating according to established principles.

It will now be apparent that the trace of the cathode ray beam on the screen of the oscilloscope 19 will represent the incoming frequencies received by receiver 11 and accepted by filter 14. Each frequency will occupy its appropriate position on the screen and the intensity of each incoming signal will be represented by the vertical amplitude of the representation of its wave. This result is best illustrated in Fig. 3. The irregular trace 20, superimposed on the scale 21, represents the appearance of the indication of the train positions while the system is operating. It will be noted that two signals indicated by $t_0$ and $t_1$ appear at the ends of the scale 21, which signals represent the presence of signals from transmitters 1 and 3 located respectively at locations $t_0$ and $t_1$. The other major rises in the curve, 22 to 26 inclusive, represent transmitters carried by various trains. Each rise appears in a position over the scale 21 which indicates its distance from the terminals and from each other train, and the scale may conveniently be graduated in terms of "blocks." The minor irregularities represented in graph 20 are due to the presence of extraneous signals and other electrical interference. Such interference will not cause difficulty, since it is minor in amplitude and appears as a flickering signal rather than as a continuous signal, as do rises 22 to 26. It should be noted that it may be desirable to have the signals $t_0$ and $t_1$ appear beyond the ends of the scale rather than at the ends of the scale. By this device the operation of the alarm when the train reaches one of the terminals may be avoided. This is done simply by starting the odometer 7 on the train 5 at a point different from the zero point. On the other hand, it may be desired to actuate the alarm upon reaching a terminal, in which case the system is left unmodified.

In adjusting the apparatus of Fig. 2 for use, the operator manipulates the usual controls of the oscilloscope 19 so that the signals generated at transmitters 1 and 3 will appear, either at the ends of the scale, or superimposed on external reference marks if the modified system above referred to is in use. It will be noted that the amplitudes of the various signals 22 to 26 are different, as shown in Fig. 3. This represents the differences in signal strength of the various transmitters. The particular curve 20, as represented in Fig. 3, is characteristic of a signal received at a location corresponding to peak 24. This peak will be higher than the others transmitted by the trains. Due to their increasing distances, the others will be progressively lower.

It was stated above that the transmitter 2 on train 5 might transmit an interrupted signal if desired. One of the purposes for the transmission of such a signal would be to provide for its use to identify the particular train transmitting.

The alarm system, as illustrated in the upper portion of Fig. 2, includes the detector 13, the low pass filter 27 and the alarm device 28. This device is very simple and reliable in operation. The detector will receive all the frequencies passed by the filter 14 and will generate signals which are the difference frequencies between them. The strongest difference signal will be generated by the combination of signals in which the product of their amplitudes is greatest. Only such signals as are applied by the detector 13 to the low pass filter 27, and passed thereby, will be applied to the alarm 28. By choosing the cutoff frequency of the low pass filter 27 to correspond to the minimum distance between trains, consistent with safety, whenever there are two trains anywhere on the track which are too close to each other, a frequency lower than the critical frequency of filter 27 will be generated in detector 13 and passed on to alarm 28. This alarm may actuate a visible or audible indicator or it may be associated with the mechanism of a train in such a manner as to control the brakes. Upon being warned by the alarm that two trains are too close together the attendants at each of the receivers carried by said two trains may examine the oscilloscopes 19 of their receivers to determine the portion of the track in which the trains are too close. If a receiver attendant on a particular train 5 wishes to determine whether his train is one of those which is too close to another, he may operate a control on his receiver 4 which will in any convenient manner interrupt the transmission by his transmitter 2 for a short period. The interruption of this signal, for a particular time corresponding to the time when the alarm is silent, will indicate to him the possibility that his train is one of those which is too close. It alone will not indicate with certainty, because the interruption, may, by chance, be identical with the interruption time caused by the attendant on one of the trains which is actually involved in the forbidden proximity region. However, a glance at the oscilloscope 19 will settle the matter.

Because of the reliance which operators may place on the apparatus here described, and to prevent accidents due to its failure, an additional alarm 29 may be connected to the detector 13 to indicate the absence of all signals in that detector. It is characteristic of detectors now used in the radio art that, whenever a signal is applied to them, a unidirectional voltage is generated. Examples of the use of this voltage occur in automatic volume control systems for radio receivers. The voltage so generated is applied to alarm 29 which, preferably, includes a mechanical device responsive to the electrical stimulus such, for example, as a relay, which relay will prevent the operation of a mechanical alarm system until the relay is de-energized. Thus, while the system is operating in the intended manner the presence of one or more signals (including that transmitted by the attendant's train) in the detector 13, will cause the electrical device to prevent the mechanical alarm from sounding. If, however, the detector 13 should fail to operate, either because of failure of the signal system or because of failure in the detector, the relay will be de-energized and the alarm 29 will be permitted to operate.

The description of my invention has indicated how it may be applied to a single track. However, it is evident that it may also be utilized with multi-track systems.

Having thus described one embodiment of my invention with particularity, the manner in which the aforesaid objects and advantages are realized will be evident.

While the invention has been illustrated and described as applied to a railroad, it will be evident that it may be utilized with other conveyances, or vehicles, such for example, as boats, airplanes, and the like.

However, it will be understood that such changes and modifications may be made in the illustrated embodiment, as may come within the scope of the appended claims.

I claim:

1. In a system for indicating at a remote point the locations of a plurality of movable objects, means at said remote point for transmitting a single signal of radio frequency, means at each of said objects for receiving said signal, means at each of said objects effective to generate a signal having a frequency differing from said first signal by an amount which is a function of the distance of said object from said remote point, apparatus at each of said objects for transmitting the last-named signals, and means at a fixed point for comparing the frequency of said first-named signal with the frequency of each of said last-named signals and for utilizing the difference in said frequencies to indicate the locations of said objects.

2. In a system for indicating at a remote point the locations of a plurality of movable objects, means at said remote point for transmitting a single signal of radio frequency, means at each of said objects for receiving said signal, means at each of said objects effective to generate a signal having a frequency differing from said first signal by an amount which is a function of the distance of said object from said remote point, apparatus at each of said objects for transmitting the last-named signals, and means for comparing the frequency of said first-named signal with the frequency of each of said last-named signals and for utilizing the difference in said frequencies to indicate the locations of said objects.

LIONEL M. RODGERS.

REFERENCES CITED

The following references are of record in the file of this patent:

UNITED STATES PATENTS

| Number | Name | Date |
| --- | --- | --- |
| 616,722 | Myers | Dec. 27, 1898 |
| 918,537 | Halvorsen | Apr. 20, 1909 |
| 1,907,471 | Alexanderson | May 9, 1933 |
| 1,993,497 | Wells | Mar. 5, 1935 |
| 1,994,232 | Schuck | Mar. 12, 1935 |
| 2,084,760 | Beverage | June 22, 1937 |
| 2,252,083 | Luck | Aug. 12, 1941 |
| 2,337,328 | Hathaway | Dec. 21, 1943 |
| 2,339,198 | Smith | Jan. 11, 1944 |
| 2,363,416 | Henroteau | Nov. 21, 1944 |
| 2,363,835 | Crosby | Nov. 28, 1944 |
| 2,378,604 | Wallace | June 19, 1945 |
| 2,381,940 | Wallace | Aug. 14, 1945 |
| 2,388,531 | Deal | Nov. 6, 1945 |

FOREIGN PATENTS

| Number | Country | Date |
| --- | --- | --- |
| 602,722 | Germany | Aug. 29, 1934 |